(12) United States Patent
Scherer, III et al.

(10) Patent No.: US 11,599,708 B2
(45) Date of Patent: *Mar. 7, 2023

(54) ENCODING OF DATA FORMATTED IN HUMAN READABLE TEXT ACCORDING TO SCHEMA INTO BINARY

(71) Applicant: Hewlett Packard Enterprise Development LP, Houston, TX (US)

(72) Inventors: William Scherer, III, Houston, TX (US); Michael Garrett, Cypress, TX (US); Jeffrey Hilland, Lago Vista, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/197,589

(22) Filed: Mar. 10, 2021

(65) Prior Publication Data

US 2021/0192124 A1  Jun. 24, 2021

Related U.S. Application Data

(63) Continuation of application No. 15/789,725, filed on Oct. 20, 2017, now Pat. No. 10,977,221.

(51) Int. Cl.
*G06F 16/20* (2019.01)
*G06F 40/14* (2020.01)
(Continued)

(52) U.S. Cl.
CPC ............ *G06F 40/14* (2020.01); *G06F 16/212* (2019.01); *G06F 16/2246* (2019.01);
(Continued)

(58) Field of Classification Search
None
See application file for complete search history.

(56) References Cited

U.S. PATENT DOCUMENTS 6,356,913 B1  3/2002  Chu et al.
6,635,088 B1  10/2003  Hind et al.
(Continued)

FOREIGN PATENT DOCUMENTS

CN  1811753 A  8/2006
CN  1836374 A  9/2006
(Continued)

OTHER PUBLICATIONS

"Redfish—Simple, Modern and Secure Management for Multi-Vendor Cloud and Web-Based Infrastructures", Distributed Management Task Force Technical Note, Aug. 2015, 3 pp.
(Continued)

*Primary Examiner* — Maikhanh Nguyen
(74) *Attorney, Agent, or Firm* — Hewlett Packard Enterprise Packard Department

(57) ABSTRACT

Data is organized in a hierarchical data tree having nodes, and is formatted in human-readable data according to a schema. The data is canonically ordered in correspondence with a canonical ordering of a schema dictionary generated from the schema. The canonically ordered data is encoded into binary, including for each node, removing a label of the node, and adding a sequence number of the node corresponding to the canonical ordering, in binary.

16 Claims, 19 Drawing Sheets

(51) Int. Cl.
*G06F 16/21* (2019.01)
*G06F 16/25* (2019.01)
*G06F 16/22* (2019.01)
*G06F 40/146* (2020.01)
*G06F 40/149* (2020.01)
*G06F 40/157* (2020.01)

(52) U.S. Cl.
CPC .......... *G06F 16/258* (2019.01); *G06F 40/146* (2020.01); *G06F 40/149* (2020.01); *G06F 40/157* (2020.01)

(56) References Cited

U.S. PATENT DOCUMENTS

| | | | |
|---|---|---|---|
| 8,321,465 B2* | 11/2012 | Farber | G06Q 40/00 707/804 |
| 8,849,755 B2* | 9/2014 | Otsuka | G06F 16/256 707/634 |
| 8,954,400 B2 | 2/2015 | Brown | |
| 9,002,859 B1 | 4/2015 | Ward | |
| 9,305,119 B1 | 4/2016 | Partovi et al. | |
| 10,042,875 B2 | 8/2018 | Warren, Jr. | |
| 10,275,489 B1* | 4/2019 | Muniswamy Reddy | G06F 16/2453 |
| 10,445,334 B1* | 10/2019 | Xiao | G06F 16/2246 |
| 2004/0068696 A1 | 4/2004 | Seyrat et al. | |
| 2004/0225754 A1 | 11/2004 | Lee | |
| 2004/0243396 A1 | 12/2004 | Liu et al. | |
| 2005/0203884 A1 | 9/2005 | Allen et al. | |
| 2006/0059187 A1 | 3/2006 | Brown | |
| 2006/0168513 A1 | 7/2006 | Coulson et al. | |
| 2006/0265693 A1 | 11/2006 | Goldin | |
| 2007/0130541 A1 | 6/2007 | Louch et al. | |
| 2008/0098020 A1 | 4/2008 | Gupta et al. | |
| 2012/0218130 A1 | 8/2012 | Boettcher et al. | |
| 2013/0232152 A1 | 9/2013 | Dhuse et al. | |
| 2013/0246906 A1 | 9/2013 | Hamon | |
| 2013/0325870 A1 | 12/2013 | Rouse et al. | |
| 2014/0026029 A1 | 1/2014 | Kamiya | |
| 2014/0344569 A1 | 11/2014 | Li | |
| 2015/0112999 A1 | 4/2015 | Sivasubramanian et al. | |
| 2015/0256195 A1 | 9/2015 | Gopal et al. | |
| 2015/0271229 A1 | 9/2015 | Bullotta et al. | |
| 2016/0028625 A1 | 1/2016 | Hari et al. | |
| 2016/0117410 A1 | 4/2016 | Kamiya | |
| 2016/0259764 A1 | 9/2016 | Kamiya | |
| 2016/0342645 A1 | 11/2016 | Tempero et al. | |
| 2017/0060912 A1 | 3/2017 | Liu et al. | |
| 2017/0141791 A1 | 5/2017 | Balegar et al. | |
| 2017/0177604 A1 | 6/2017 | Geissinger et al. | |

FOREIGN PATENT DOCUMENTS

| | | |
|---|---|---|
| CN | 104185845 A | 12/2014 |
| EP | 3051429 A1 | 8/2016 |
| FR | 2954983 A1 | 7/2011 |
| WO | 2005/081408 A1 | 9/2005 |

OTHER PUBLICATIONS

European Search Report and Search Opinion Received for EP Application No. 18201877.0, dated Dec. 19, 2018, 10 pages.

Fang, Q., "JSONlab: a toolbox to encode/decode JSON files", MathWorks, online < https://in.mathworks.com/matlabcentral/fileexchange/33381-jsonlab-a-toolbox-to-encode-decode-json-files >, Oct. 20, 2011, 47 pp.

Michel Kramer, "Binary JSON with bson4jackson", available online at <https://www.michel-kraemer.com/binary-json-with-bson4jackson/ >, Jan. 30, 2011, 20 pages.

Redfish White Paper, Redfish, Document Identifier: DSP2044, Version 1.0.2, Jun. 15, 2016, 27 pp.

Sebastian Maneth et al: "XML Tree Structure Compression", Database and Expert Systems Application, 2008. DEXA '08. 19th International Conference on, IEEE, Piscataway, NJ, USA, Sep. 1, 2008 (Sep. 1, 2008), pp. 243-247, XP031320655, ISBN: 978-0-7695-3299-8.

Series X: Data Networks, Open System Communications and Security OSI networking and system aspects—Abstract Syntax Notation One (ASN.1) Infonrnation technology-ASN.1 encoding rules: Specification of Basic Encoding Rules (BER), Canonical Encoding Rules (CER) and Distinguished Encoding Rules (DER), ITU-T, Telecommunication Standardization Sector of ITU, X.690, Aug. 2015, 38 pp.

Wu et al., English Abstract of "A Comprehensive Object-oriented Scheme on the Messaging of the Application Protocol", China Academic Journal Electronic Publishing House, Mar. 1, 2005, 4 pages.

Zhao et al., English Abstract of "Research on RFID Tag Code Filtering Method Based on Trie Tree and Extended B Tree" ACTA Electronica Sinica, vol. 39, No. 3A, Mar. 2011, 8 pages.

* cited by examiner

FIG 1A

```
<Schema url="http://redfish.dmtf.org/.../redfish-schema.v1_1_0.json"
title="DummySimpleSchema" version="1.2.0">
    <Item name="DummySimple" type="set">
        <Link name="Id" ref="http://redfish.dmtf.org/.../definitions/Id"/>
        <Item name="SampleIntegerProperty" type="number" readonly="no" optional="no"/>
        <Item name="SupportEnabledProperty" type="boolean" readonly="yes" optional="yes"/>
        <Item name="ChildArrayProperty" type="array">
            <Link name="" ref="http://redfish.dmtf.org/.../definitions/ChildArray"/>
        </Item>
    </Item>
</Schema>
<Schema url="http://redfish.dmtf.org/schemas/v1/Resource.json#/definitions/Id"
title="IdSchema" version="1.0.0">
    <Item name="Id" type="string" readonly="yes" optional="no"/>
</Schema>
<Schema url="http://redfish.dmtf.org/.../redfish-schema.v1_1_0.json"
title="ChildArraySchema" version="1.0.0">
    <Item name="ChildArray" type="set">
        <Item name="LinkStatus" type="enum" enumtype="String" readonly="yes" optional="no">
            <Enumeration value="LinkUp"/>
            <Enumeration value="NoLink"/>
            <Enumeration value="LinkDown"/>
        </Item>
        <Item name="AnotherBoolean" type="boolean" readonly="yes" optional="yes"/>
    </Item>
</Schema>
```

```
150
<Schema url=".../redfish-schema.v1_1_0.json" title="DummySimpleSchema" version="1.2.0">
  <Item name="DummySimple" type="set" seq="0"> ← 152
    <Item name="ChildArrayProperty" type="array" arraytype="set" seq="0"/> ← 154A
    <Item name="array element 0" seq="0"/> ← 155A     156A        156B
      <Item name="AnotherBoolean" type="boolean" readonly="yes" optional="yes" seq="0"/>
      <Item name="LinkStatus" type="enum" enumtype="string" readonly="yes" optional="no" seq="1"/>
        <Enumeration value="LinkDown" seq="0"/>
        <Enumeration value="LinkUp" seq="1"/>     ← 158
        <Enumeration value="NoLink" seq="2"/>
      </Item>
    <Item name="array element 1" seq="1"/> ← 155B
      <Item name="AnotherBoolean" type="boolean" readonly="yes" optional="yes" seq="0"/>
      <Item name="LinkStatus" type="enum" enumtype="string" readonly="yes" optional="no" seq="1"/>
        <Enumeration value="LinkDown" seq="0"/>
        <Enumeration value="LinkUp" seq="1"/>
        <Enumeration value="NoLink" seq="2"/>
      </Item>
    <Item name="array element 2" seq="2"/> ← 155C
    ...
    </Item>
  </Item>
  <Item name="Id" type="string" readonly="yes" optional="no" seq="1"/> ← 154B
  <Item name="SampleIntegerProperty" type="number" readonly="no" optional="no" seq="2"/> ← 154C
  <Item name="SupportEnabledProperty" type="boolean" readonly="yes" optional="yes" seq="3"/> ← 154D
  </Item>
</Schema>
```

FIG 2A

```
274  <Item name="DummySimple" type="set" seq="0">
276A   <Item name="ChildArrayProperty" type="array" seq="0">
278A     <Item name="array element 0" seq="0">
280A       <Item name="AnotherBoolean" type="boolean" value="true" seq="0"/>
280B       <Item name="LinkStatus" type="enum" enumtype="string" seq="1">
284C         <Enumeration value="NoLink" seq="2"/>
           </Item>
278B     <Item name="array element 1" seq="1">
282A       <Item name="AnotherBoolean" optional="yes" NOT PRESENT seq="0"/>
282B       <Item name="LinkStatus" type="enum" enumtype="string" seq="1">
286A         <Enumeration value="LinkDown" seq="0"/>
           </Item>
         </Item>
276B   <Item name="Id" type="string" value="Dummy ID" seq="1"/>
276C   <Item name="SampleIntegerProperty" type="number" value="12" seq="2"/>
276D   <Item name="SupportEnabledProperty" type="boolean" optional="yes" NOT PRESENT seq="3"/>
     </Item>
```

```
274  <Item type="set" seq="0">
276A   <Item type="array" seq="0">
278A     <Item seq="0">
280A       <Item type="boolean" value="true" seq="0"/>
280B       <Item type="enum" enumtype="String" seq="1">
284C         <Enumeration seq="2"/>
           </Item>
278B     <Item seq="1">
282A       <Item optional="yes" NOT PRESENT seq="0"/>
282B       <Item type="enum" enumtype="String" seq="1">
286A         <Enumeration seq="0"/>
           </Item>
         </Item>
276B   <Item type="string" value="Dummy ID" seq="1"/>
276C   <Item type="number" value="12" seq="2"/>
276D   <Item type="boolean" optional="yes" NOT PRESENT seq="3"/>
     </Item>
```

```
274  <Item type="set" seq="0">
276A   <Item type="array" seq="0">
278A     <Item seq="0">
280A       <Item type="boolean" value="true" seq="0"/>
280B       <Item type="enum" enumtype="String" seq="1">
284C         <Enumeration seq="2"/>
           </Item>
278B     <Item seq="1">
282B       <Item type="enum" enumtype="String" seq="0"/>
286A         <Enumeration seq="0"/>
           </Item>
         </Item>
276B   <Item type="string" value="Dummy ID" seq="1"/>
276C   <Item type="number" value="12" seq="2"/>
     </Item>
```

274 {0x00, set, [length placeholder], {
  {count = 3}
276A {0x00, array, [length placeholder], {
    {count = 2}
278A {0x00, set, [length placeholder], {
      {count = 2}
280A {0x00, boolean, [length placeholder], true}
280B {0x01, enum, [length placeholder], 2}
    }
278B {0x01, set, [length placeholder], {
      {count = 1}
282B {0x01, enum, [length placeholder], 0}
    }
  }
276B {0x01, string, [length placeholder], "Dummy ID"}
276C {0x02, integer, [length placeholder], 12}
}

274 ~ {0x00, 0x01, [length placeholder], {
    0x03
276A ~ {0x00, 0x02, [length placeholder], {
    0x02
278A ~ {0x00, 0x01, [length placeholder], {
    0x02
    280A ~ {0x00, 0x03, [length placeholder], 0xFF}
    280B ~ {0x01, 0x04, [length placeholder], 0x02}
}
278B ~ {0x01, 0x01, [length placeholder], {
    0x01
    282B ~ {0x01, 0x04, [length placeholder], 0x00}
}
276B ~ {0x01, 0x06, [length placeholder],
    0x44 0x75 0x6D 0x79 0x20 0x49 0x44 0x00}
276C ~ {0x02, 0x05, [length placeholder], 0x0C}
}

FIG 2F

274 {0x00, 0x01, 0x29,
0x03
276A {0x00, 0x02, 0x15,
0x02
278A {0x00, 0x01, 0x09,
0x02
280A {0x00, 0x03, 0x01, 0xFF}
280B {0x01, 0x04, 0x01, 0x02}
}
278B {0x01, 0x01, 0x05,
0x01
282B {0x01, 0x04, 0x01, 0x00}
}
276B {0x01, 0x06, 0x09, 0x6D, 0x79, 0x20, 0x49, 0x44
0x44 0x75 0x6D 0x01, 0x0C}
276C {0x02, 0x05, 0x01, 0x00}
}

| | | | | | | | |
|---|---|---|---|---|---|---|---|
|0x00|0x01|0x29|0x03|0x00|0x02|0x15|0x02|
|0x00|0x01|0x09|0x02|0x00|0x03|0x01|0xFF|
|0x01|0x04|0x01|0x02|0x01|0x01|0x05|0x01|
|0x01|0x04|0x01|0x00|0x01|0x06|0x09|0x44|
|0x75|0x6D|0x6D|0x79|0x20|0x49|0x44|0x00|
|0x02|0x05|0x01|0x0C| | | | |

```
274  {0x00, 0x01, 0x29,
        0x03
276A  {0x00, 0x02, 0x15, {
        0x02
278A  {0x00, 0x01, 0x09, {
        0x02
280A  {0x00, 0x03, 0x01, 0xFF}
280B  {0x01, 0x04, 0x01, 0x02}
      }
278B  {0x01, 0x01, 0x05, {
        0x01
282B  {0x01, 0x04, 0x01, 0x00}
      }
      }
276B  {0x01, 0x06, 0x09,
        0x44 0x75 0x6D 0x6D 0x79 0x20 0x49 0x44 0x00}
276C  {0x02, 0x05, 0x01, 0x0C}
      }
```

```
{0x00, 0x01, {
  {0x00, 0x02, {
    {0x00, 0x01, {
      {0x00, 0x03, 0xFF}
      {0x01, 0x04, 0x02}}
    }
    {0x01, 0x01, {
      {0x01, 0x04, 0x00}}
    }
  }
  {0x01, 0x06, 0x44 0x75 0x6D 0x6D 0x79
                0x20 0x49 0x44 0x00}
  {0x02, 0x05, 0x0C}
}
```

```
274 ~ {0x00, set, {
  276A ~ {0x00, array, {
    278A ~ {0x00, set, {
      280A ~ {0x00, boolean, 0xFF}
      280B ~ {0x01, enum, 0x02}
    }
    278B ~ {0x01, set, {
      282B ~ {0x01, enum, 0x00}
    }
  }
  276B ~ {0x01, string, 0x44 0x75 0x6D 0x6D 0x79
                       0x20 0x49 0x44 0x00}
  276C ~ {0x02, integer, 0x0C}
}
```

FIG 3D

```
{0x00, set, {
    {0x00, array, {
        {0x00, set, {
280A─{0x00, boolean, true}
280B─{0x01, enum, <value 2>}
        }
        {0x01, set, {
282B─{0x01, enum, <value 0>}
        }
    }
276B─{0x01, string, "Dummy ID"}
276C─{0x02, integer, 12}
}
```

200

```
274 ~ {"DummySimple", set, {
276A ~ {"ChildArrayProperty", array, {
278A ~ {<Array Element 0>, set, {
280A ~ {"AnotherBoolean", boolean, true}
280B ~ {"LinkStatus", enum, "NoLink"}
}
278B ~ {<Array Element 1>, set, {
282B ~ {"LinkStatus", enum, "LinkDown"}
}
}
276B ~ {"Id", string, "Dummy ID"}
276C ~ {"SampleIntegerProperty", integer, 12}
}
```

```
{
274 ⌒ "DummySimple" : {
276A ⌒ "ChildArrayProperty" : [
278A ⌒ {
280A ⌒ "AnotherBoolean" : true,
280B ⌒ "LinkStatus" : "NoLink"
},
278B ⌒ {
282B ⌒ "LinkStatus" : "LinkDown"
}
],
276B ⌒ "Id" : "Dummy ID",
276C ⌒ "SampleIntegerProperty" : 12
}
}
```

↙ 200

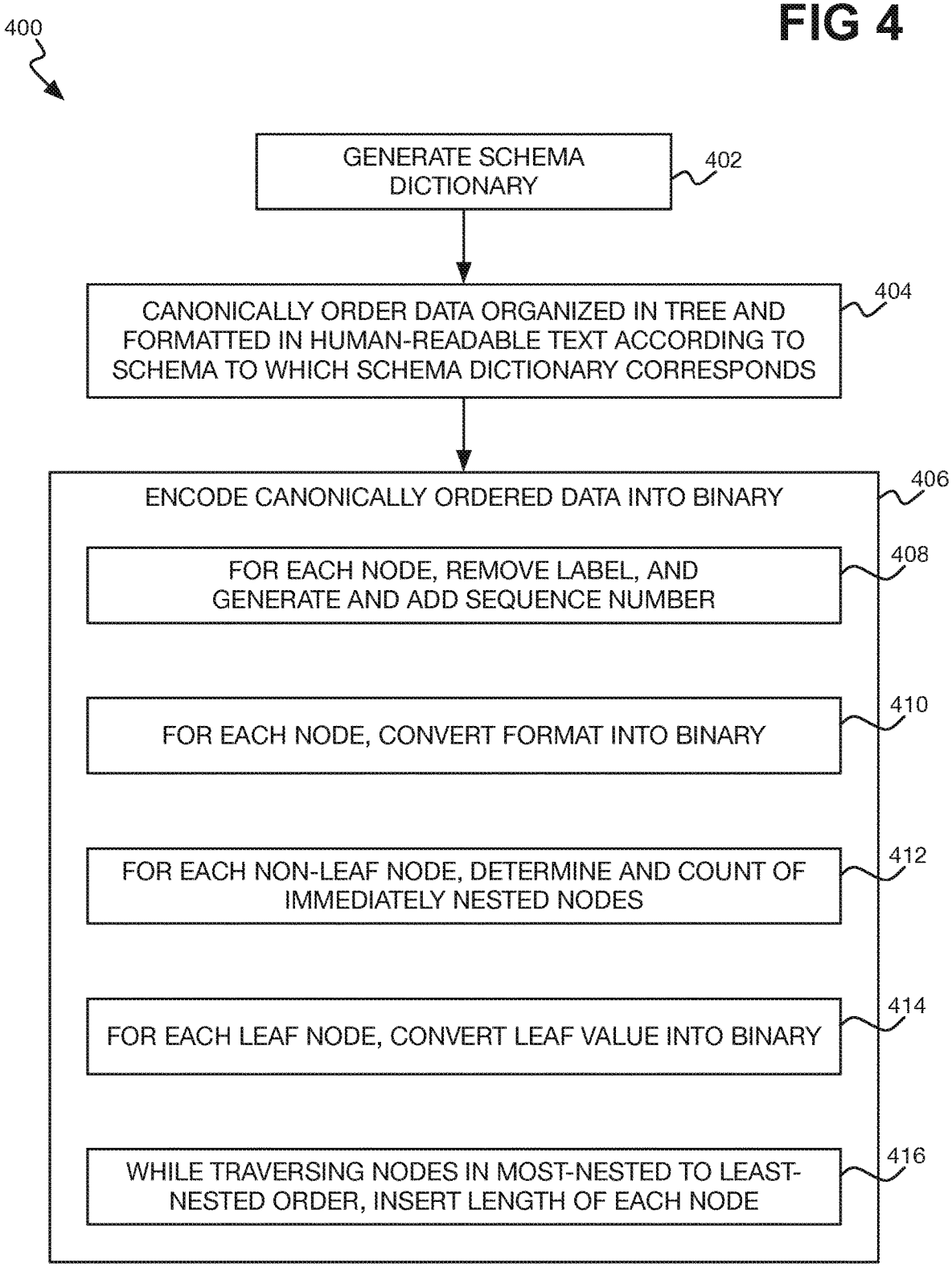

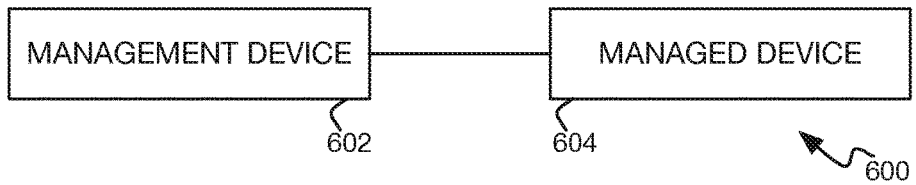
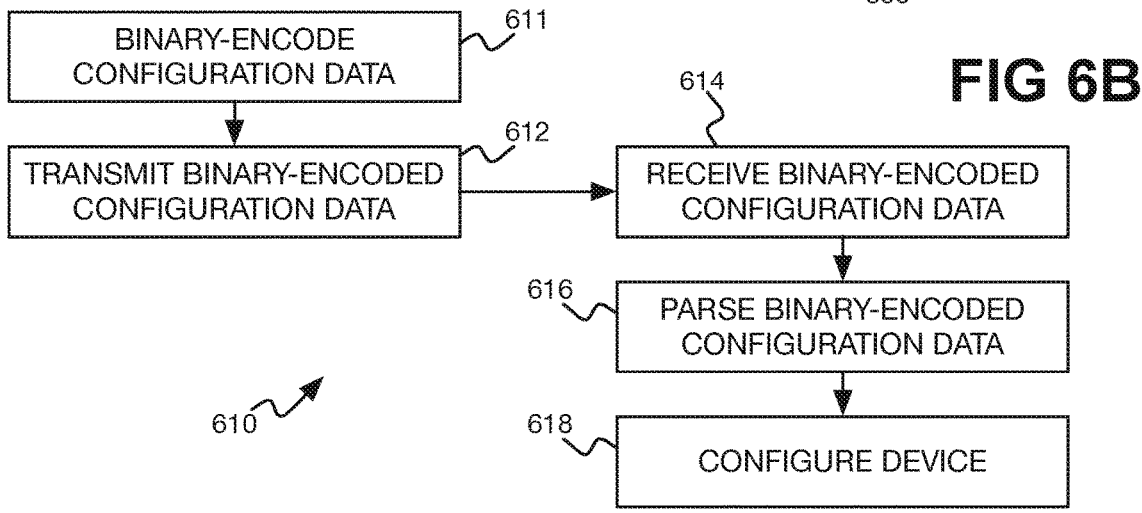
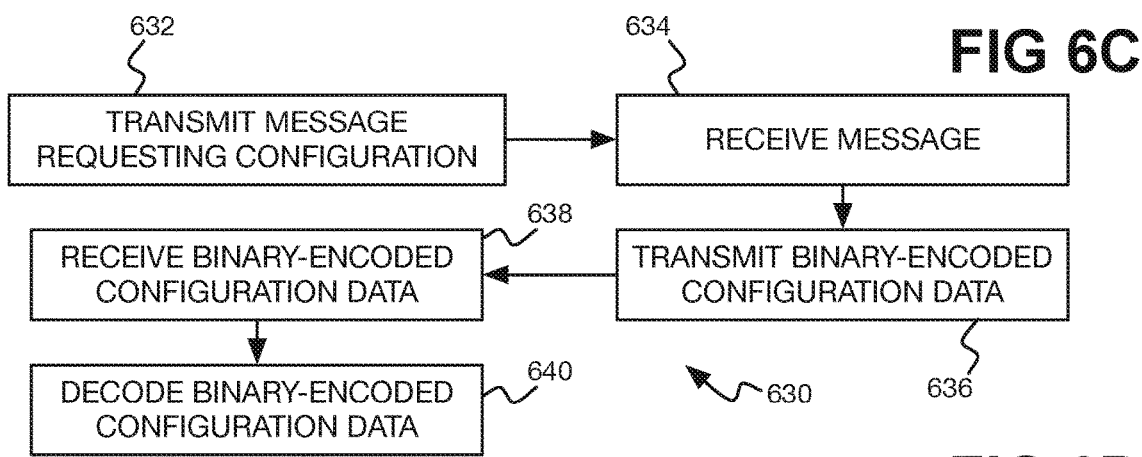
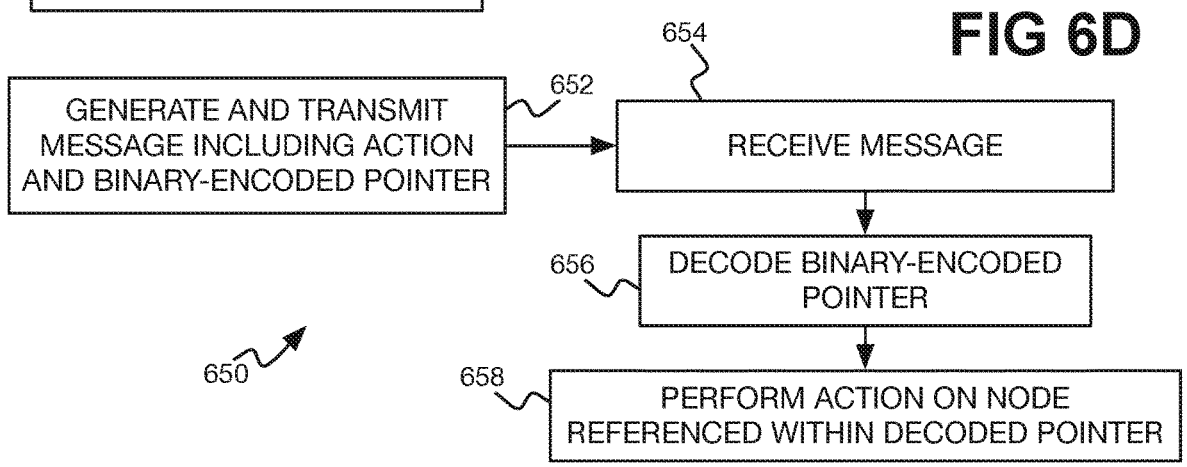

ENCODING OF DATA FORMATTED IN HUMAN READABLE TEXT ACCORDING TO SCHEMA INTO BINARY

BACKGROUND

A modern enterprise computing environment, as well as other computing environments, can include a great number and a great diversity of different types of devices. Such devices can include server computing devices, network computing devices, and so on. Devices within a computing environment usually have to be managed, including configuration of the devices so that they properly and optimally perform within their current environment. Furthermore, some devices can themselves include other devices. For example, a server computing device may include a network interface card (NIC) device, which itself has to be configured.

BRIEF DESCRIPTION OF THE DRAWINGS

FIG. 1A is a diagram of an example schema, FIG. 1B is an illustrative diagram of an example schema dictionary corresponding to this schema, in explicative text form.

FIGS. 2A, 2B, 2C, 2D, 2E, 2F, and 2G are diagrams illustratively depicting an example of encoding data formatted in human-readable text according to the schema of FIG. 1A into binary, using the schema dictionary of FIG. 1B.

FIGS. 3A, 3B, 3C, 3D, 3E, and 3F are diagrams illustratively depicting an example of decoding the binary-encoded data of FIG. 2G into human-readable text according to the schema of FIG. 1A, using the schema dictionary of FIG. 1B.

FIG. 4 is a flowchart of an example method for encoding data formatted in human-readable text according to a schema, such as the encoding example presented in FIGS. 2A-2G.

FIG. 6A is diagram of an example system, and FIGS. 6B, 6C, and 6D are flowcharts of example methods that can be performed in relation to the example system, consistent with the example methods of FIGS. 4 and 5.

DETAILED DESCRIPTION

As noted in the background section, devices within computing environments have to be managed. One way a device can be managed is to send the device a management message. The management message may include a request to set different parameters of the device with values specified in the message. A management message may also request the return of the current values of the device's parameters, as well as request other information or request the performance of other actions besides configuration.

Due to the great number of device manufacturers and the diversity of their devices, there has been an impetus to settle on a common standard by which devices can be managed regardless of their manufacturer and regardless of their type. For ease of use, many proposed standards specify that device configurations be specified in human-readable text formats, such as markup-language formats, which are specified according to standard-dictated schemas. An example of such a proposed standard that is gaining traction within the industry is the Redfish® open industry standard specification and schema promulgated by the Distributed Management Task Force (DMTF), Inc., of Portland, Oreg. The Redfish standard specifies a RESTful interface that utilizes JavaScript Object Notation (JSON) as a human-readable text data-interchange format.

A characteristic of formatting device configurations particularly, and data more generally, in human-readable text according to a schema is that human-readable text formats are usually highly verbose and are relatively large in size, as compared to formatting device configurations in binary. Using human-readable text as a way to manage devices is beneficial because an administrator or other user can easily discern a given device's configuration by simply reading its configuration text. However, using verbose human-readable text can be difficult if near impossible for devices that lack large amounts of memory to store their configurations in this form. For example, network interface card (NIC) devices and devices that are implemented as system on chip (SoC) devices may not have the requisite memory to store configurations in bloated form.

Techniques described herein ameliorate these difficulties. Data formatted in human-readable text according to a schema is encoded into binary. Such a binary representation is greatly condensed in size as compared to the same information in human-readable text form, rendering it usable for configuration purposes even with devices that have small amounts of memory. As one example, any labels for fields within the human-readable text-formatted data do not have be encoded in the binary representation, because they can be replaced by sequence numbers in the binary representation that represent them. The encoding is reversible, which permits decoding of binary-encoded data so that, for instance, an administrator or other user is still able to easily review a human-readable text version of the data.

Figure 1C:
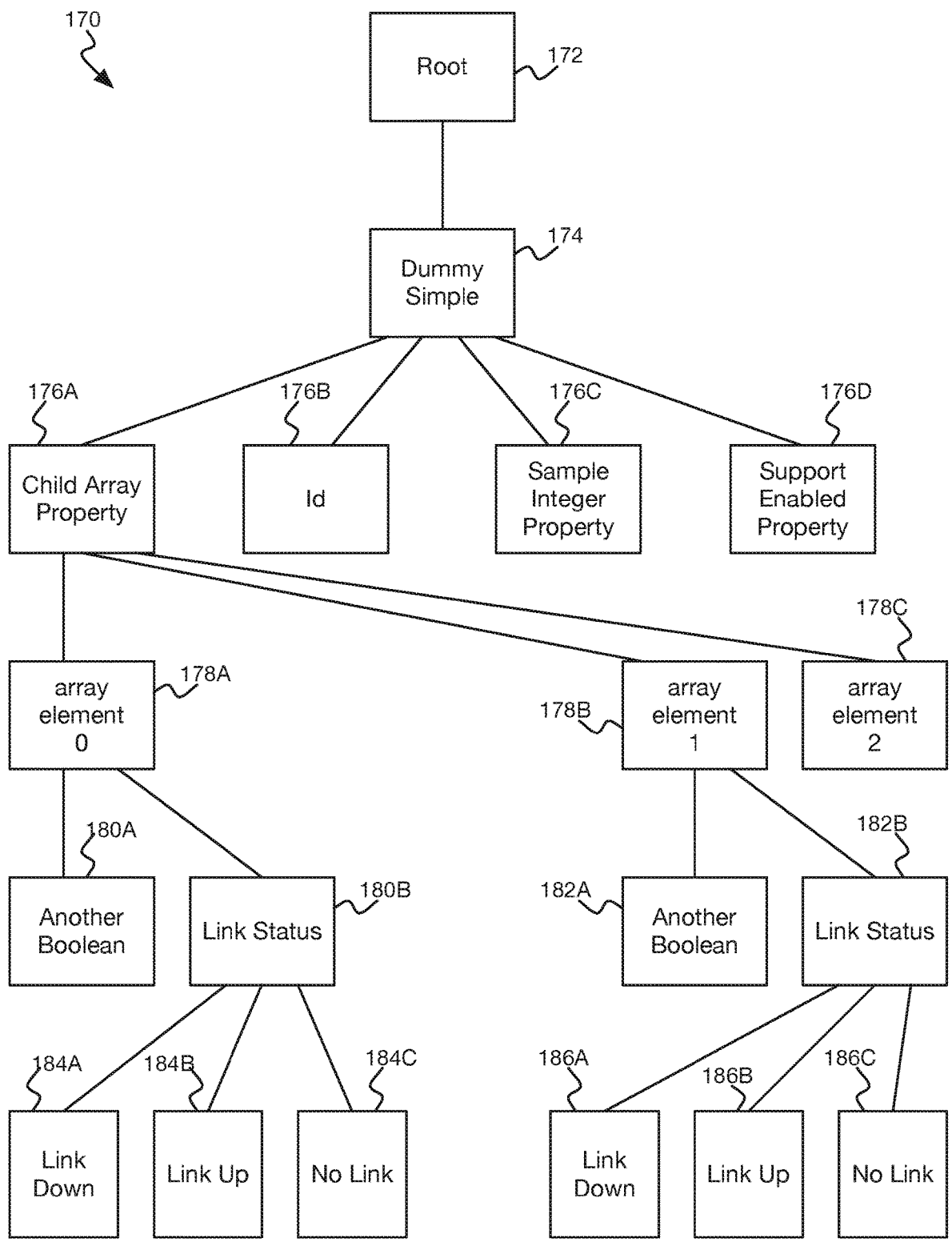
FIG. 1C is a diagram of an example hierarchical tree corresponding to this example schema dictionary.

FIG. 1A shows an example schema 100, FIG. 1B illustratively depicts an example schema dictionary 150 corresponding to and generated from the schema 100, and FIG. 1C shows an example hierarchical tree 170 corresponding to the schema dictionary 150. A schema can be generally considered the definition or specification of the organization, structure, content, and/or semantics of data formatted according to the schema. A schema dictionary, as this term is used herein, can be generally considered a compact, canonically ordered version of the schema in binary, including just the information that is sufficient to decode encoded data.

The schema dictionary 150 as illustratively depicted in FIG. 1B is shown in text form for illustration and explanatory purposes, but in actuality can be stored as a binary large object (blob), which is a collection of binary data stored as a single entity. That is, FIG. 1B shows the schema dictionary 150 as text just so that a description thereof can be easily presented. Furthermore, in the example of FIGS. 1A, 1B, and 1C, the canonical ordering of the schema dictionary is an alphabetical ordering. However, an ordering other than an alphabetical ordering can also be employed. The ordering is canonical in that it is prescribed ahead of time, and is known to both a device performing data encoding and a device performing data decoding. An ordering can be an arbitrary assignment in this respect, even random, so long as both the encoding and decoding devices know the ordering.

The schema 100 of FIG. 1A is defined by a schema 102 that refers to or incorporates two other schemas 104A and 104B, which are collectively referred to as the schemas 104. Line 106A of the schema 102 references the schema 104A, for instance, and line 106B references the schema 104B. The lines 106A and 106B of the schema 102 can be collectively referred to as the lines 106. The schema dictionary 150 can be generated from the schema 100 by first expanding the schema 102 of the schema 100 to include the referenced schemas 104. That is, in the schema dictionary 150, the references to the schemas 104 in the lines 106 of the schema 102 are replaced by the schemas 104 themselves.

Generation of the schema dictionary 150 from the schema 100 continues by canonically ordering—such as alphabetizing—the nodes of the expanded schema 100 according to their names. For example, in the schema 100 of FIG. 1A, the order of the nodes within the node named "Dummy Simple" is the node named "Id," followed by the node named "SamplelntegerProperty," followed by the node named "SupportEnabledProperty," followed by the node named "ChildArrayProperty." By comparison, in the schema dictionary 150 of FIG. 1B, the order of these nodes is the canonical order in which the node named "ChildArrayProperty" is first, the node named "Id" is second, the node named "SupportEnabledProperty" is third, and the node "SupportlntegerProperty" is last. The nodes named "LinkUp," "NoLink," "LinkDown" in each of the nodes named "array element 0" and "array element 1" are also alphabetized.

Generation of the schema dictionary 150 from the schema 100 can conclude by sequence numbering the nodes of the canonically ordered and expanded schema 100. A sequence number is added to each node except for the root node itself. The sequence numbers are added to the children node(s) of the node in which the children node(s) are immediately nested in the order (derived from the canonical ordering) in which they appear within this nesting node. For example, in FIG. 1B the root node includes one immediately nested node, which is named "DummySimple." A sequence number 152 of zero is added to this node.

The node named "DummySimple" includes four immediately nested nodes, those named "ChildArrayProperty," "Id," "SampleintegerProperty," and "SupportEnabledProperty," and sequence numbers 154A, 154B, 154C, and 154D of zero, one, two, and three, collectively referred to as the sequence numbers 154, are respectively added to these nodes. The node named "ChildArrayProperty" includes three immediately nested nodes, named "array element 0," "array element 1," and "array element 2." Sequence numbers of 155A, 155B, and 155C of zero, one, and two, collectively referred to as the sequence numbers 155, are respectively added to these nodes.

The nested nodes of the node named "ChildArrayProperty" are identical to one another, and the first of these nodes, the node named "array element 0" is representatively described. The node named "array element 0" has two immediately nested nodes, those named "AnotherBoolean" and "LinkStatus," and sequence numbers 156A and 156B of zero and one, collectively referred to as the sequence numbers 156, are respectively added to these nodes. The node named "LinkStatus" has three immediately nested nodes, "LinkDown," "LinkUp," and "NoLink," which are assigned sequence numbers 158 of zero, one, and two, respectively.

The hierarchical tree 170 of FIG. 1C includes a root schema node 172, which corresponds to the root node of the schema dictionary 150. Directly nested within the node 172 is the node 174 named "DummySimple," and which has the sequence number 152 in FIG. 1B. Directly nested within the node 174 are the nodes 176A, 176B, 176C, and 176D, named "ChildArrayProperty," "Id," "SamplelntegerProperty," and "SupportEnabledProperty," which are collectively referred to as the nodes 176. The nodes 176 have the sequence numbers 154 in FIG. 1B.

The node 176A has (at least) three directly nested nodes 178A, 178B, and 178C, named "array element 0," "array element 1," and "array element 2," and which are collectively referred to as the nodes 178. The nodes 178 have the sequence numbers 155 in FIG. 1B. The node 178A has two directly nested nodes 180A and 180B, named "AnotherBoolean" and "LinkStatus," which are collectively referred to as the nodes 180, and which have the sequence numbers 156 in FIG. 1B. The node 1780B likewise has two directly nested nodes 182A and 182B, which are collectively referred to as the nodes 182.

The node 180B has directly nested nodes 184A, 184B, and 184C, named "LinkDown," "LinkUp," and "NoLink," and which are collectively referred to as the nodes 184. The nodes 184 have the sequence numbers 158 in FIG. 1B. The node 182B likewise has directly nested nodes 186A, 186B, and 186C, named "LinkDown," "LinkUp," and "NoLink," and which are collectively referred to as the nodes 186.

FIGS. 2A-2G show example encoding of example data 200 formatted in human-readable text according to the schema 100 of FIG. 1A into binary, using the schema dictionary 150 of FIG. 1B. That is, the data 200 is example data, used to describe by example the encoding process according to the schema dictionary 150. In these figures, the data 200 has nodes that correspond to counterpart nodes of the schema dictionary 150 in the hierarchical data tree 170 of FIG. 1C. A node 1XX in FIG. 1C is a counterpart node to the node 2XX in FIGS. 2A-2G (as well as in FIGS. 3A-3F). Specifically, the node 274 corresponds to the node 174; the nodes 276A, 276B, 276C, and 276D, collectively referred to as the nodes 276, correspond to the nodes 176; and the nodes 278A and 278B, collectively referred to as the nodes 278, correspond to the nodes 178. The nodes 280A and 280B, collectively referred to as the nodes 280, correspond to the nodes 180; the nodes 282A and 282B, collectively referred to as the nodes 282, correspond to the nodes 182; the node 284C corresponds to the node 184; and the node 286A corresponds to the node 186A.

In FIG. 2A, the data 200 has been canonically ordered and sequence numbers have been added to nodes, in the manner as has been described above in relation to the schema 100 and the schema dictionary 150. For illustrative and explanatory purposes, in FIG. 2A, each node of the schema 100 that is optional and that is actuality not present in the data 200 has been added to the data 200, along with a denotation "NOT PRESENT"; in actuality, however, such nodes do not have to be added to the data 200. For instance, the node 176D of the schema dictionary 150, named "SupportEnabledProperty" is optional, and is not actually present in the data 200, but the node 276D has been added to the data 200 for example purposes.

After having been canonically ordered and having had sequence numbers added, the data 200 is organized in the hierarchical data tree 170 of the schema dictionary 150 of FIG. 1B, insofar as the data 200 has nodes that are present in the data tree 170 of FIG. 1C. Stated another way, the hierarchical data tree of the data 200 is a subset of the hierarchical data tree 1700 of the schema dictionary 150. As such, some nodes can be omitted but no nodes are added.

In FIG. 2B, the data 200 has had what are considered labels of each node removed. Labels can include object names such as the text "Item" and "Enumeration" of FIG. 2A and field names such as the text "name" and "value" of FIG. 2A. The labels can be removed when encoding the data 200 into binary because this information is present within the schema dictionary 150 corresponding to the schema 100 according to which the data 200 is formatted. The canonical ordering of and the addition of sequence numbers to the nodes of each of the schema dictionary 150 and the data 200 permits the subsequent retrieval of the labels during decoding of the binary-encoded data 200. This is because the order of the immediately nested nodes within a given node of the data 200 is identical to the corresponding canonical order of the schema dictionary 150, and because the sequence numbers of such nodes within the data 200 match their counterpart sequence numbers within the dictionary 150. The usage of the schema dictionary 150 thus permits maximal compression of the data 200 when encoding the data 200 into binary.

Once the sequence numbers in particular have been generated and added to the data 200, the sequence numbers preserve the ability to match nodes of the data 200 with nodes of the dictionary 150, even if specific sequence numbers are missing in the data 200 due to the removal of their nodes. For example, in FIG. 2C, the first (and only) nested node 282B within the node 278B has a sequence number of one, not of zero, because the node 282A having the sequence number of zero has been removed. However, since the sequence number of the remaining node 282B is present, subsequent decoding can identify that this node 282B corresponds to the node 182B of the schema dictionary 150, and not the node 182A thereof in FIG. 1C.

In FIG. 2D, the sequence number of each node within the data 200 has been encoded into binary as a simple, non-negative integer and moved to the beginning of the node. For example, the sequence number of the top-most node 274 is zero, and has been encoded as "0x00" and moved to the beginning of this node 274. An exception to encoding the sequence number of each node within the data 200 into binary as an integer and moving the sequence number to the beginning of the node is with respect to leaf nodes that are direct nested within nodes having the format type "enum." The sequence numbers of such leaf nodes are added as values at the end of the nodes in which they are directly nested, and the leaf nodes removed. For example, the node 280B in FIG. 2D has an ending value two, which is the sequence number of the leaf node 284C in FIG. 2C; the node 284C has been removed from the data 200 in FIG. 2D. That is, for such enumerations, an enumerated value's sequence number is stored as the data for its type in the binary encoding.

The node 280B has an enumeration data type (i.e., a format of data type "enum"), which can be just one possible value of multiple values. Specifically, the node 280B is named "LinkStatus" (per the corresponding node 180B of FIG. 1C), and can have a value of "LinkDown" if the node 280B has the node 284A as its leaf node, a value of "LinkUp" if the node 280B has the node 284B as its leaf node, or a value of "NoLink" if the node 280B has the node 284C as its leaf node (per the corresponding nodes 184A, 184B, and 184C of FIG. 1C). Thus, the sequence number of the leaf node of the node 280B in effect represents the value of the node 280B. Therefore, the leaf node in question—here, the leaf node 284B—can be removed, and its sequence number added to the end of the node 280B as its value. In this respect, the node 280B becomes a leaf node with the removal of the leaf node 284B.

In FIG. 2D, a count of the number of nodes immediately nested within each non-leaf node has been determined and indicated within the data 200 via a placeholder "{count=X}," where X is this count. For example, the node 274 has four nodes 276 immediately nested within the node 274. A placeholder of the length of the value (or the data) of each leaf node has also been added to the data in FIG. 2D.

Any node that does not have at least one other node nested therein is a leaf node. For example, the nodes 276B, 276C, 276D, 280A, 282A, 284, and 286 are leaf nodes. A node that is not a leaf node is considered a non-leaf node, and is a node in which at least one other node is nested. The count of the number of nodes may not be included in one implementation. This is because subsequent decoding of the encoding data can be achieved without using the counts, and rather just by iteratively using the lengths of the nodes. However, the counts are useful for pre-allocating space or other resources.

In FIG. 2E, the format of each node, the count of each non-leaf node, and the (leaf) value of each leaf node have been encoded into binary within the data 200. The format of a node indicates the data type of the node, such as set, array, Boolean, string, number, and so on. The format of each node is encoded into binary with reference to a table of formats for the schema dictionary 150 that maps formats to binary values. In the example of FIG. 2E, for instance, the format type "set" is mapped to binary 0x01, the format type "array" is mapped to binary 0x02, and the format type "boolean" is mapped to binary 0x03. Furthermore, the format type "enum" is mapped to binary 0x04, the format type "integer" is mapped to binary 0x05, and the format type "string" is mapped to 0x06.

The leaf value of each leaf node is encoded into binary depending on the format type of the leaf node in question. A leaf node having a format type "boolean" can have a value of true mapped to 0xFF and a value of false mapped to 0x00. A leaf node having a format type "enum" is encoded into binary as a simple non-negative integer. A leaf node having a type "string" can have each character of its string value represented in Unicode, ASCII, or another representation. A leaf node having a format type "integer" may be encoded into binary as a signed integer value. The count of each non-leaf node is also encoded into binary as a simple non-negative integer.

In FIG. 2F, the length of each node has been encoded as a simple non-negative integer into binary within the data 200. Any value that is encoded into binary as a simple non-negative integer, including the length of each node, the count of each node, the leaf value of each leaf node of type "enum," and so on, can so be encoded as follows. If the value is less than 128, the integer can be encoded in a single byte with its value. If the value is equal to or greater than 128, the first byte of the encoding can be 0x80 logically OR'ed with the number of bytes needed to represent the integer. For example, the value sixteen is encoded as 0x10. The value represented in hexadecimal as 0x12345678 is encoded as the string of bytes 0x84, 0x12, 0x34, 0x56, and 0x78.

The lengths of the nodes of the data 200 are encoded into binary while the nodes are traversed in a most-nested to least-nested order. In the example of FIG. 2F, the lengths 202 of the leaf nodes 280 and 282B are first encoded into binary as simple non-negative integers. This is because the leaf nodes 280 and 282B are most nested, being directly nested by the nodes 278, and indirectly nested by the nodes 276A and 274, for a total of three nesting nodes. The length 204 of the node 278 is next encoded into binary, because the node 278 is nested by two nodes. The lengths 206 of the nodes 276 are then encoded into binary, because the nodes 276 are each nested by just one node 274. The length 208 of the node 274 is then encoded into binary.

FIG. 2G shows the final binary-encoded version of the data 200 of the human-readable text version of FIG. 2A that is formatted according to the schema 100. The data 200 of FIG. 2G can be generated by writing out the data 200 of FIG. 2F in the order of its bytes in FIG. 2F—i.e., 0x00, 0x01, 0x29, 0x03, 0x00, 0x02, 0x015, 0x02, . . . , 0x44, 0x00, 0x02, 0x05, 0x01, 0x0C. One computing device can transmit the binary-encoded data 200 to another computing device. The latter computing device can then decode the received binary-encoded data 200 of FIG. 2G to (re)generate the data 200 of FIG. 2A that is formatted in human-readable text according to the schema dictionary 150, as is now described in detail.

Figure 3B:

FIGS. 3A-3F show example decoding of the example binary-encoded data 200 of FIG. 2G to human-readable text formatted according to the schema 100 of FIG. 1A, using the schema dictionary 150 of FIG. 1B. The encoded data 200 is example data, used to describe by example the decoding process according to the schema dictionary 150. In FIG. 3A, the data 200 is divided into nodes 274, 276, 278, 280, and 282. This can be achieved as follows. The bytes are processed in the order in which they appear in the binary-encoded data 200. The first byte is the sequence number 0x00 of the top-most node 274, and the second number is the format 0x01 of this node 274, which means that the node 274 is a set of other nodes. The third byte specifies the length in bytes of the count and the nodes that are part of this set, which is 0x29=41. The fourth byte specifies the count of nodes that are immediately or directly nested within the node 274, which is a total of three nodes.

As such, the next byte is the sequence number 0x00 of the first node 276A directly nested within the node 274. The second byte of the node 276A specifies the format 0x02 of this node 276A, which means that the node 276A is an array of other nodes. The third byte specifies the length in bytes of the count and the nodes that are part of this array, which is 0x09. The fourth byte specifies the count of nodes that are immediately or directly nested within the node 276A, which is total of two nodes.

The next byte is the sequence number 0x00 of the first node 280A directly nested within the node 278A. The second byte of the node 280A specifies the format 0x03 of this node 280A, which means that the node 280A is Boolean. The third byte of the node 280A indicates the length of the value of the node 280A, which is a leaf node since it is not a set or an array. The value of the node 280A is thus in the fourth byte, 0xFF, which is logical true.

The next byte is the sequence number 0x01 of the second node 280B directly nested within the node 278B. The second byte of the node 280B specifies the format 0x04 of this node 280B, which means that the node 280B is of type "enum." The third byte of the node 280B indicates the length 0x01 of the value of the node 280B, which is a leaf node since it is not a set or an array. The value of the node 280B is thus in the fourth byte, 0x02, which is "NoLink."

The next byte is the sequence number 0x01 of the second node 278B directly nested within the node 276A. The second byte of the node 278B specifies the format 0x01 of this node 278B, which means that the node 278B. The third byte specifies the length in bytes of the count and the nodes that are part of this set, which is 0x05. The fourth byte specifies the count of nodes that are immediately or directly nested within the node 278B, which is just one node.

The next byte is the sequence number 0x01 of the sole node 282B directly nested within the node 278B. The second byte of the node 282B specifies the format 0x04 of this node 282B, which means that the node 282B is of type "enum." The third byte of the node 282B indicates the length 0x01 of the value of the node 282B, which is a leaf node since it is not a set or an array. The value of the node 282B is thus in the fourth byte, 0x00, which is "LinkDown."

The next byte is the sequence number 0x01 of the second node 276B directly nested within the node 274. The second byte of the node 276B specifies the format 0x06 of this node 276B, which means that the node 276B is of type "string." The third byte of the node 276B indicates the length 0x09 of the value of the node 276B, which is a leaf node since it is not a set or an array. The value of the node 282B is thus the next nine bytes, which corresponds to the text string "Dummy ID."

The next byte is the sequence number 0x02 of the third and last node 276C directly nested within the node 274. The second byte of this node 276C specifies the format 0x05 of the node 276C, which means that the node 276C is of type "number." The third byte of the node 276C indicates the length 0x01 of the value of the node 276C, which is a leaf node since it is not a set or an array. The value of the node 282B is thus in the fourth byte, 0x0C, which corresponds to the integer value 12.

Therefore, the bytes of the binary-encoded data 200 can be processed to determine when nodes start, and what nodes each node contains or whether the node is a leaf node, by particularly examining the format, length, and count values. The format of a node dictates whether the node contains other nodes or is a leaf node. The length indicates when the current node ends, and the count indicates for nodes of format set or array the number of directly nested nodes.

In FIG. 3B, the bytes corresponding to the counts and the lengths have been removed from the data 200. The counts and the lengths are used just to reproduce the hierarchical data tree of the nodes of the data 200, as has been described in relation to FIG. 3A. That is, the counts and the lengths are used just to demarcate when nodes start and end, and which nodes are nested in which other nodes. Therefore, once this information has been decoded, the counts and the lengths are no longer used.

In FIG. 3C, the binary-encoded format of each node within the data 200 has been converted to the human-readable text format of the node. The format is specified by the second byte of the node. The reverse mapping of the table used in FIG. 2E to convert the format from text to binary is used in FIG. 3C to convert the format from binary to text. Thus, the format code 0x01 of the nodes 274, 276A, and 278B is replaced by the text "set." The format code 0x02 of the node 276A is replaced by the text "set." (It is noted that an intermediate data structure may be used for such sets, rather than the actual text, "set".) The format code 0x03 of the node 280A is replaced by the text "boolean." The format code 0x04 of the nodes 280A and 282B is replaced by the text "enum." The format code 0x05 of the node 276C is replaced by the text "integer," and the format code 0x06 of the node 276B is replaced by the text "string."

In FIG. 3D, the binary-encoded (leaf) value of each leaf node within the data 200 has been replaced by the human-readable text value of the node. The (leaf) value of each leaf node is encoded in the binary values beginning immediately after the human-readable text format of the node that replaced the binary-encoded format of the node. The reverse of the process used in FIG. 2E to convert leaf node values into binary is used in FIG. 3D, based on the formats of the leaf node. As such, the binary value 0xFF of the node 280A, which has a Boolean format, is replaced by the text "true." The binary value 0x02 of the node 280B can be temporarily replaced by the text "<value 2>," and the binary value 0x00 of the node 282B can temporarily be replaced by the text "<value 0>." These two nodes 280B and 282B are of format "enum," and therefore will be subsequently processed further, since the values 2 and 0 actually refer to particular enumerated types, as has been described above in relation to FIGS. 2D and 2E. The nine binary values of the node 276B, which has a format of "string," are converted back to the text "Dummy ID," and the binary value of the node 276C, which has a format of "integer," is converted back to the textual form of the integer "12."

Figure 3E:
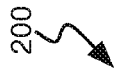

In FIG. 3E, the sequence numbers have been replaced with their labels within the data 200 using the schema dictionary 150 of FIG. 1B, and the text for the leaf nodes of type "enum" has likewise been replaced with their (leaf) values within the data 200 using the schema dictionary 150 of FIG. 1B. As to the former, the sequence number of each node within the data 200 is replaced by the label specified for the identically nested node having the same sequence number within the schema dictionary 150. For example, the node 274 has its sequence number replaced with the label "DummySimple" of the identically nested node having the same sequence number within the schema dictionary 150. The same process is used to replace the sequence numbers of the nodes 276A, 280A, 280B, 282B, 276B, and 276C with the labels "ChildArrayProperty," "AnotherBoolean," "LinkStatus," "LinkStatus," "Id," and "SampleIntegerProperty," respectively.

For each of the leaf nodes 280B and 282B of type "enum," the text is replaced with leaf values using the schema dictionary 150 by referencing the node within the schema dictionary 150 that has a sequence number equal to the value of the leaf node in question and that is nested within the node corresponding to the leaf node 280B in the dictionary 150. For example, the leaf node 280B corresponds to the node having the sequence number 156B in the schema dictionary 150 in FIG. 1B. This leaf node 280B has three nested nodes with sequence numbers 158 of 0, 1, and 2. The node with the sequence number 158 of 2 has the same sequence number as the value of the leaf node 280B. Therefore, the text "<value 2>" of the node 280B is replaced with the enumeration value "NoLink" within the data 200 of FIG. 3E.

In FIG. 3F, the final decoding of the data 200 has been performed so that the data 200 is in the desired human-readable text format. In the example of FIG. 3F, this format is JSON. As such, the text indicating the formats "set," "array," "boolean," "enum," "string," and "integer" have been removed from the data 200. Colons (":") have been added to each node within the data 200 consistent with JSON. Brackets ("[" and "]") have been added to surround the nodes 278A and 278B that are array elements of the array that is the node 276A. Commas (",") have been added between successive nodes that are nested within the same node that has a format of set. For example, the nodes 278A and 278B that are the two nested nodes of the node 276A, which has a format of set, have a comma between them.

The schema dictionary-formatted human readable text of the data 200 of FIG. 3F is just an example of the format of human readable text to which the binary-encoded data 200 of FIG. 2G can be decoded. Furthermore, the data 200 of FIG. 3F can be converted back to the binary-encoded data of FIG. 2G by following the process that has been described in relation to FIGS. 2A-2G. For instance, the data 200 of FIG. 2A can be realized from the data 200 of FIG. 3F by processing the data 200 according to the schema dictionary 150 and by canonically ordering and adding sequence numbers to the nodes of the data 200.

FIG. 4 shows an example method 400 for generating a binary-encoded version of data that is currently formatted in human-readable text according to a schema. The method 400 thus encapsulates the examples of FIGS. 1A-1C and FIGS. 2A-2G that have been described. A computing device can perform the method 400. For instance, a processor of a computing device can execute program code stored on a non-transitory computer-readable data storage medium to perform the method 400.

The method 400 can include generating the schema dictionary from a schema to which the schema dictionary corresponds (402). This can be achieved as has been described in relation to FIGS. 1A and 1B, by canonically ordering the schema, and sequence-numbering the canonically ordered schema. In one implementation, if the computing device performing the method 400 does not have the schema dictionary in accordance with which the data to be binary encoded is currently formatted in human-readable text, then the computing device itself performs part 402. In another implementation, a different computing device may generate the schema dictionary, and transmit the schema dictionary to the computing device performing the method 400. The schema dictionary may just be generated once, and then subsequently used for encoding and decoding multiple sets of data.

The computing device performing the method 400 canonically orders the data that is currently formatted in human-readable text according to the schema (404). The data can be further organized in a hierarchical data tree that has nodes, as has been described. Canonical ordering of the data can be performed as has been described in relation to FIG. 2A.

The computing device then encodes the canonically ordered data into binary (406), by performing the process that has been described by example in relation to FIGS. 2A-2G. For instance, binary encoding of the canonically ordered data can include, for each node, removing the label(s) of the node and generating and adding a sequence number to the node (408), per FIGS. 2A and 2B. The sequence number of a node effectively represents the removed label(s) of the name, including its object name and field name of the node, in correspondence with a mapping within the schema dictionary, per FIG. 1B. In one implementation the sequence number of a node further effectively specifies the order of this node in relation to any other node within the same immediate, or direct, nesting node. For example, if nodes A, B, and C are directly nested within node D, and if nodes E and F is directly nested within node B, then the sequence number of node B is two, since it is second among the nodes A, B, and C immediately within node D. Furthermore, the sequence number of node F is also two, since it is second among the nodes E and F immediately within node B. The sequence number of each node can be encoded into binary as a simple, non-negative integer, as has been described.

It is noted that the sequence numbering can be one-based numbering (where the first number in the order is one), can be zero-based numbering (where the first number in the order is zero), or another type of numbering. Furthermore, more generally the sequence number of a node is unique relative to any other node within the same immediate nesting node. The numbers do not have to be sequential, for instance.

Binary encoding of the canonically ordered data can include converting the format of each node into binary (410), per FIG. 2B. Node format conversion into binary can be achieved by referencing a node's format against a table of formats that are mapped to binary. Binary encoding may include determining a count of immediately nested nodes in each non-leaf node, and adding this count (as converted into binary) within the non-leaf node (412), per FIG. 2D. In the example of the previous paragraph, nodes B and D are non-leaf nodes. Node B has a count of two, since two nodes E and F are directly nested within node B. Node D has a count of three, since three nodes A, B, and C are directly nested within node D. The counts can each be encoded into binary as a simple, non-negative integer.

Binary encoding of the canonically ordered data can include converting the leaf value of each leaf node into binary (414), per FIG. 2E. How the leaf value of a leaf node is converted into binary depends on the format of the leaf node, as described in relation to FIG. 2E. Binary encoding further can include inserting the length of each node (as converted into binary) within the node, while the nodes of the canonically ordered data are traversed from most nested to least nested (416), per FIG. 2F. In the example of the previous paragraph, the nodes E, and F may have their lengths determined first, since each of these nodes is nested within two other nodes, nodes B and D, where node B is nested within node D. The nodes A, B, and C may have their lengths determined next, since each of these nodes is nested within one other node, node A. The lengths can each be encoded into binary as a simple, non-negative integer.

Figure 5:
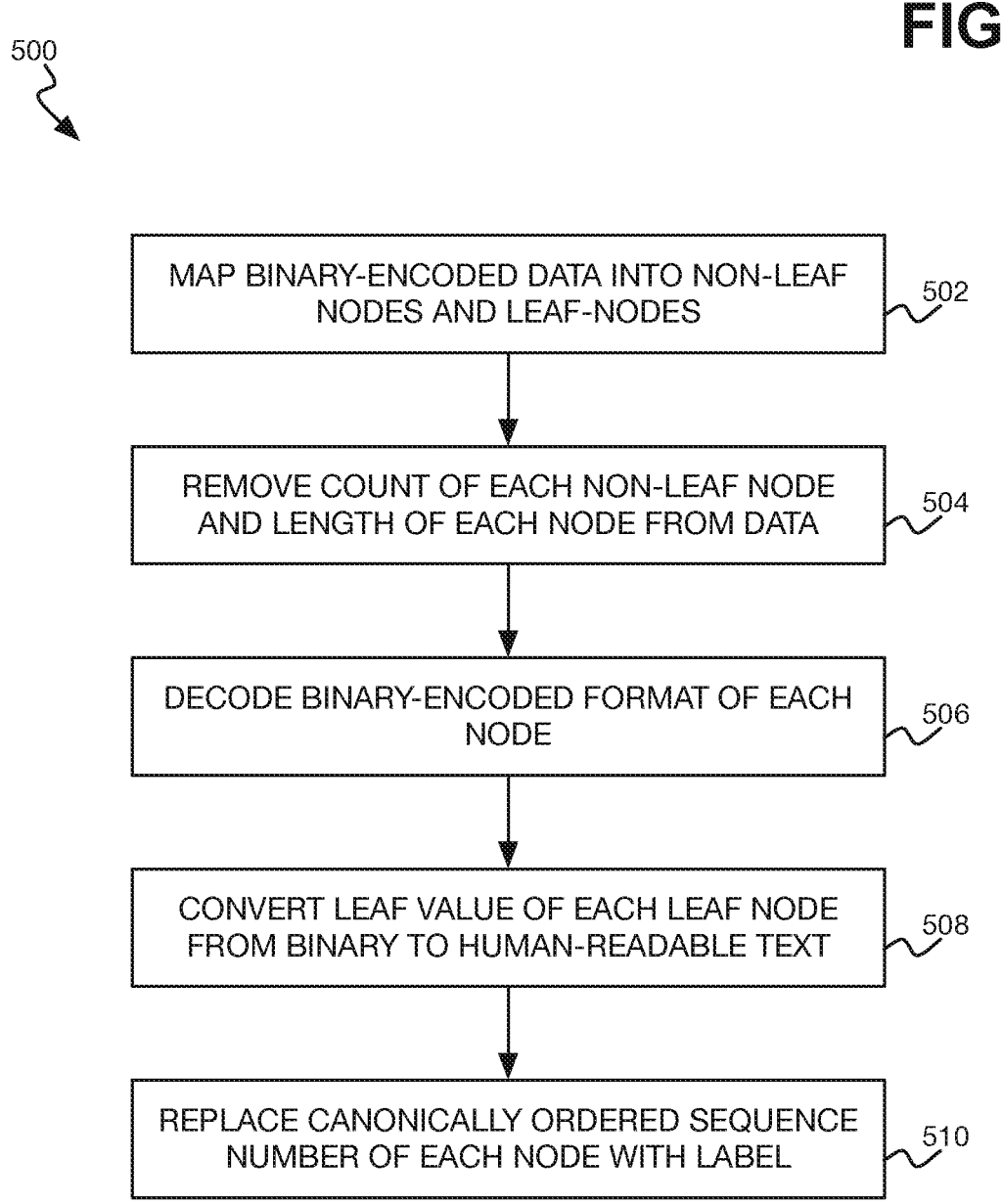
FIG. 5 is a flowchart of an example method for decoding binary-encoded data into human-readable text according to a schema, such as the decoding example in FIGS. 3A-3F.

FIG. 5 shows an example method 500 for generating human-readable text formatted according to a schema, from binary-encoded data. The method 500 thus encapsulates the example of FIGS. 3A-3F that has been described. A computing device can perform the method 500. For instance, a processor of a computing device can execute program code stored on a non-transitory computer-readable data storage medium to perform the method 500.

The method 500 can include mapping the binary-encoded data into non-leaf nodes and leaf nodes of a hierarchical data tree that stores canonically ordered data (502). This division of the data into nodes can be achieved as described in relation to FIG. 3A. That is, part 520 can be performed based on the count within the binary-encoded data for each non-leaf node, which specifies the number of nodes immediately nested within the non-leaf node in question. Part 520 can further be performed based on (just) the length within the binary-encoded data of each node.

The method 500 can include subsequently removing the count of each non-leaf node and the length of each node from the data undergoing decoding (504), per FIG. 3B. The counts and the lengths are not needed once the data has been mapped into non-leaf nodes and leaf nodes. The method 500 can include decoding the binary-encoded format of each node (506), per FIG. 3C. That is, the binary value specifying the format of a node is replaced with a human-readable text version of that format by referencing the binary value against a table mapping binary values to formats (and/or vice-versa). The method 500 can include converting the leaf value of each leaf node from binary to human-readable text (508), as has been described above in relation to FIG. 3D.

The canonically ordered sequence number of each node is replaced with label(s) of the node (510), per FIG. 3E. Specifically, the sequence number of a node is replaced with the label(s) specified for this sequence number within the schema dictionary that was originally used to encode the data into binary, in correspondence with the mapping of the schema dictionary. As has been described, the sequence number of a node may specify the node's order in relation to any other node within the same immediate or direct nesting node.

FIG. 6A shows an example system 600, whereas FIGS. 6B, 6C, and 6D show example methods 210, 230, and 250, respectively, which can be performed within the system 600. The system 600 includes a management device 602 and a managed device 604. The management device 602 may be a computing device, like a desktop or laptop computer, a server computer, or another type of computing device.

The managed device 604 is a device that the management device 602 manages. The device 604 may be another, different computing device, such as another computer, or another type of computing device like a networking device, such as a router, a network interface card (NIC), a logical device, a portion of a hardware device, and so on. The managed device 604 may be part of the same chassis as the management device 602, or may be external to the device 602. In the former case, both devices 602 and 604 may be computing cards connected to the same backplane, the device 604 may be inserted within a slot of the device 602, and so on.

In the example methods 610, 630, and 650, the management device 602 performs parts in the left column, whereas the managed device 604 performs parts in the right column. In the method 610 of FIG. 6B, the management device 602 encodes configuration data formatted in human-readable text according to a schema into binary (611). For instance, the management device 602 may perform the method 400 of FIG. 4 that has been described. The configuration data pertains to the managed device 604.

The management device 602 transmits the binary-encoded configuration data to the managed device 604 (612), which receives this configuration data (614). The managed device 604 parses the binary-encoded configuration data (616) so that the device 604 can configure itself accordance to the configuration data (618). Note, however, the managed device 604 does not have to, and may not be able to, decode the binary-encoded configuration data back into human-readable text according to a schema dictionary.

The configuration data may initially be in human-readable form so that a user like an administrator can easily view and understand the configuration at the management device 602. By comparison, the managed device 604 can interpret the configuration data directly in its binary form, without decoding the configuration data back to human-readable text. The managed device 604 just has to know how the configuration data has been encoded in binary, so that it can parse the binary-encoded configuration data for accordingly configuring itself. In this respect, the managed device 604 may have a version of the schema dictionary in accordance with which the configuration data has been encoded into binary by the management device 602. The managed device 604 may perform part 502 of the method 500 to demarcate the nodes of the hierarchical data tree in accordance with which the data is organized.

In one implementation, the managed device 604 may not even have sufficient memory that is freely available to store the configuration data in human-readable form. For example, certain NICs may have a large number of configuration settings, but at the same time lack a large amount of available memory to store the correspondingly, relatively large human-readable form of the configuration data. However, the techniques described herein permit such NICs to nevertheless be compatible with data formats that employ human-readable text, because the configuration settings are encoded into binary before transmission to the NICs.

In the method 630 of FIG. 6C, the management device 602 transmits a message requesting a current configuration of the managed device 604 (632). The managed device 604 receives this message (634), and in response transmits binary-encoded configuration data back to the management device 602 (636). The managed device 604 may lack the capability to transmit the configuration data in human-readable text according to a schema dictionary, for instance, lack the available memory to store such a human-readable form of the configuration data, or the processing capability to perform such decoding. However, the managed device 604 can read out its configuration settings and put them in a binary-encoded format consistent with the format in which the management device 602 can encode configuration data in part 611 of FIG. 6B. In this respect, the managed device 604 may just have to have knowledge of a version of the schema dictionary so that it can properly format the data, without converting the data into human-readable form.

The management device 602 thus receives the binary-encoded configuration data (638), and decodes the data into human-readable text that is formatted according to a schema (640). The management device 602 can decode the binary-encoded data by performing the method 500 of FIG. 5 that has been described. As such, it is the management device 602, which may have more available memory and greater processing capability, that decodes binary-encoded configuration data in the method 630, as well as encodes into binary configuration data formatted in human-readable text according to a schema dictionary. In this respect, the techniques described herein permit the managed device 604 to be compatible with configuration data formats that employ human-readable text, without having to have knowledge or use the textual format itself, and while maintaining its ability to process the configuration data just in binary form.

In the method 650 of FIG. 6D, the management device 602 generates and transmits a message that includes an action and a binary-encoded pointer (652). The message pertains to just one node of a hierarchical data tree in which configuration data is organized, or a sub-tree beginning at a particular node. The message may be to overwrite configuration data for a configuration setting corresponding to a specified node or a sub-tree beginning at this node, or delete the configuration data for the specified node or a sub-tree beginning at this node. The message may be to add a new configuration setting, with corresponding configuration data, at a new node below a specified node, or to read or retrieve the current configuration data for configuration settings corresponding to the specified node or a sub-tree beginning at this node. The message may also be to retrieve configuration setting information from the subtree beginning at this particular node.

The binary-encoded reference pointer can be a sequence of pointer integers that specify particular nodes, in order (i.e., by their commonly agreed upon sequence numbers), within successive nested levels of the nodes within a hierarchical data tree. The sequence may be prefaced by a count integer that specifies the number of such pointer integers that follow. For example, in the hierarchical data tree 170 of FIG. 1C, the node 182A may be specified by a sequence of pointer integers 0x01, 0x01, 0x02, 0x01. The first integer 0x01 specifies the node 174 that is in the first nested level, below the root node 172. The second integer 0x01 specifies the node 176A that is in the second nested level, below the node 174. The third integer 0x02 specifies the node 178B that is in the third nested level, below the node 176A. The fourth integer 0x01 specifies the node 182A that is in the fourth nested level, below the node 178B. As such, even for configuration data organized over a large hierarchical data tree, a relatively small amount of data can be used to identify any node or the sub-tree beginning at any node.

The managed device 604 receives the message from the management device 602 (654). The managed device 604 decodes the binary-encoded pointer within the message (656). For example, the managed device 604 can conclude that the number of pointer integers within the sequence of pointer integers is equal to the prefatory count integer. The managed device 604 then traverses the hierarchical data structure, such as from a version of the schema dictionary stored within the device 604, until the managed device 604 arrives at the node specified within the received message. The managed device 604 thus performs the action on the node referenced within the decoded pointer (658). More specifically, as to configuration data, the managed device 604 can perform the action relative to the configuration setting that corresponds to the specified node.

The techniques that have been described herein leverage a schema dictionary to maximally encoded verbose human-readable data into binary. Such binary encoding permits configuration and other data formats that rely on human-readable text to nevertheless be compatible with managed devices that may not have sufficient processing power or available memory to otherwise be compatible with the formats. The schema dictionary is used to both encode data formatted in human-readable text, and also to decode the resulting binary-encoded data back into human-readable text.

We claim:

1. A non-transitory, computer-readable medium storing instructions that, when executed by a processor, cause a managed device to:
   receive a command from a managing device requesting a current configuration of the managed device;
   identify a configuration information schema dictionary stored on the managed device;
   select a set of configuration data points present in the configuration information schema dictionary from a configuration tree of the managed device;
   binary encode each of the configuration data points consistent with the configuration information schema dictionary;
   construct a binary data object consistent with the configuration information schema dictionary that includes the binary encoded set of configuration data points; and
   transmit the binary data object to the managing device;
   receive, from the managing device, a second command including a binary encoded pointer and a desired action;
   determine, based on the binary encoded pointer, an indicated node of the configuration tree of the managed device; and
   perform the desired action on the indicated node,
   wherein the configuration information schema dictionary is a schema dictionary generated by the managing device and deployed on the managed device, and
   wherein the configuration information schema dictionary includes information to format configuration information into a binary data object as well as information to format configuration information into a human readable configuration object.

2. The computer-readable medium of claim 1, wherein the configuration information schema dictionary includes a version which corresponds with a particular format of configuration information as a binary data object.

3. The computer-readable medium of claim 1, wherein the managed device is incapable of transmitting the configuration data points in a human readable form.

4. The computer-readable medium of claim 3, wherein the binary data object is convertible into a human readable form.

5. The computer-readable medium of claim 4, wherein the binary data object is convertible into a human readable form by formatting the binary encoded configuration data points of the binary data object into human readable configuration data points using the configuration information schema dictionary.

6. The computer-readable medium of claim 1, wherein the binary encoded pointer is a sequence of pointer integers that specify nodes in successive nested level of the configuration tree and a count integer specifying how many pointer integers to follow to determine the indicated node.

7. The computer-readable medium of claim 1, wherein the indicated node is a node of the configuration information schema dictionary and performing the desired action on the indicated node comprises identifying a configuration setting of the managed device corresponding to the indicated node.

8. A method executed by a processor of a managed device, the method comprising:
receiving a command from a managing device requesting a current configuration of the managed device;
identifying a configuration information schema dictionary stored on the managed device;
selecting a set of configuration data points present in the configuration information schema dictionary from a configuration tree of the managed device;
binary encoding each of the configuration data points consistent with the configuration information schema dictionary;
constructing a binary data object consistent with the configuration information schema dictionary that includes the binary encoded set of configuration data points; and
transmitting the binary data object to the managing device;
receiving, from the managing device, a second command including a binary encoded pointer and a desired action;
determining, based on the binary encoded pointer, an indicated node of the configuration tree of the managed device; and
performing the desired action on the indicated node,
wherein the configuration information schema dictionary is a schema dictionary generated by the managing device and deployed on the managed device, and
wherein the configuration information schema dictionary includes information to format configuration information into a binary data object as well as information to format configuration information into a human readable configuration object.

9. The method of claim 8, wherein the binary data object is formatted based in part on the configuration information schema dictionary.

10. The method of claim 9, wherein the binary data object includes a version number which corresponds with a particular format of configuration information.

11. The method of claim 8, wherein formatting the binary data object into a human readable format includes dividing the binary data object and sequentially processing the divided binary data object.

12. The method of claim 8, wherein the managed device is incapable of transmitting the binary data object in a human readable form.

13. The method of claim 8, wherein the binary encoded pointer is a sequence of pointer integers that specify nodes in successive nested level of the configuration tree and a count integer specifying how many pointer integers to follow to determine the indicated node.

14. The method of claim 8, wherein the indicated node is a node of the configuration information schema dictionary and performing the desired action on the indicated node comprises identifying a configuration setting of the managed device corresponding to the indicated node.

15. The method of claim 8, further comprising transmitting the configuration information schema dictionary to the managed device.

16. A system, comprising:
a managing device comprising a processor and a memory including instructions, the instructions executed by the processor to cause the managing device to:
transmit, to a managed device, a first command requesting configuration information;
receive, from the managed device, a binary data object including formatted binary encoded configuration data points;
format the binary data object into a human readable format, based in part on a configuration information schema dictionary;
display the human readable formatted data object to an administrator; and
transmit, to the managed device, a second command including a binary encoded pointer and a desired action; and
the managed device comprising a processor and a memory including instructions, the instructions executed by the processor to cause the managed device to:
receive the first command from the managing device requesting a current configuration of the managed device;
identify a configuration information schema dictionary stored on the managed device;
select a set of configuration data points present in the configuration information schema dictionary from a configuration tree of the managed device;
binary encode each of the configuration data points consistent with the configuration information schema dictionary;
construct a binary data object consistent with the configuration information schema dictionary that includes the binary encoded set of configuration data points;
transmit the binary data object to the managing device;
receive, from the managing device, the second command including the binary encoded pointer and the desired action;
determine, based on the binary encoded pointer, an indicated node of the configuration tree of the managed device; and
perform the desired action on the indicated node.

* * * * *